United States Patent [19]

Komatsu

[11] Patent Number: 5,283,508
[45] Date of Patent: Feb. 1, 1994

[54] POSITIONAL CONTROL APPARATUS
[75] Inventor: Toshiteru Komatsu, Aichi, Japan
[73] Assignee: Okuma Corporation, Nagoya, Japan
[21] Appl. No.: 889,127
[22] Filed: May 26, 1992
[30] Foreign Application Priority Data
May 27, 1991 [JP] Japan .................................. 3-121390
[51] Int. Cl.⁵ .............................................. G05B 19/18
[52] U.S. Cl. ................................ 318/569; 318/568.11; 318/568.12; 318/568.21; 318/574; 318/575; 318/560; 318/565; 318/566; 318/567; 318/600
[58] Field of Search ................ 318/568.11, 568.12, 318/568.21, 569, 574, 575, 560, 565, 566, 567, 600

[56] References Cited
U.S. PATENT DOCUMENTS

| | | | |
|---|---|---|---|
| 4,812,722 | 3/1989 | Corrothers | 318/561 |
| 4,906,907 | 3/1990 | Tsuchihashi et al. | 318/574 X |
| 5,047,701 | 9/1991 | Takarada et al. | 318/574 X |
| 5,173,648 | 12/1992 | Kawamura et al. | 318/567 X |

Primary Examiner—William M. Shoop, Jr.
Assistant Examiner—Karen Masih
Attorney, Agent, or Firm—Spensley Horn Jubas & Lubitz

[57] ABSTRACT

A positional control apparatus capable of readily moving a movable part of an NC device in any desired direction by using a particular handle. The handle is mounted on the movable part by a holding part. When an operator gripping the handle wishes to move the movable part in the desired direction, a strength and a direction of force given to the handle are detected by force sensors, and an axial moving amount calculation means calculates the moving amount of each control axis in consideration of the strength and the direction of the force given to the handle, detected by the force sensors as a strength and a direction of an acceleration given to the movable part. By the moving amount of each control axis, obtained by the axial moving amount calculation means, the positional control of the movable part is performed.

8 Claims, 12 Drawing Sheets

POSITIONAL CONTROL APPARATUS

BACKGROUND OF THE INVENTION i) Field of the Invention:

The present invention relates to a positional control apparatus for use in a machine tool, a measuring device or the like having a numerical control device hereinafter referred to as an NC device.

ii) Description of the Related Arts:

In a conventional positional control apparatus used for an NC device, a manual operation mode is provided for moving a turret position for an initial setup change by an operator, obtaining a tool offset or the like. In the manual operation mode, two position control methods are provided, that is, a first position control method in which a movable part can be quickly moved at a certain feeding speed determined by a feed override switch during pushing of a manual feed button even when a specific target position is undetermined, and a second position control method suitable for accurate minute feeding, in which a movable part can be moved by an amount which is the product of a pulse number generated by rotating a pulse handle and a certain moving amount determined by a turnover switch of a feed unit amount.

Figure 9:
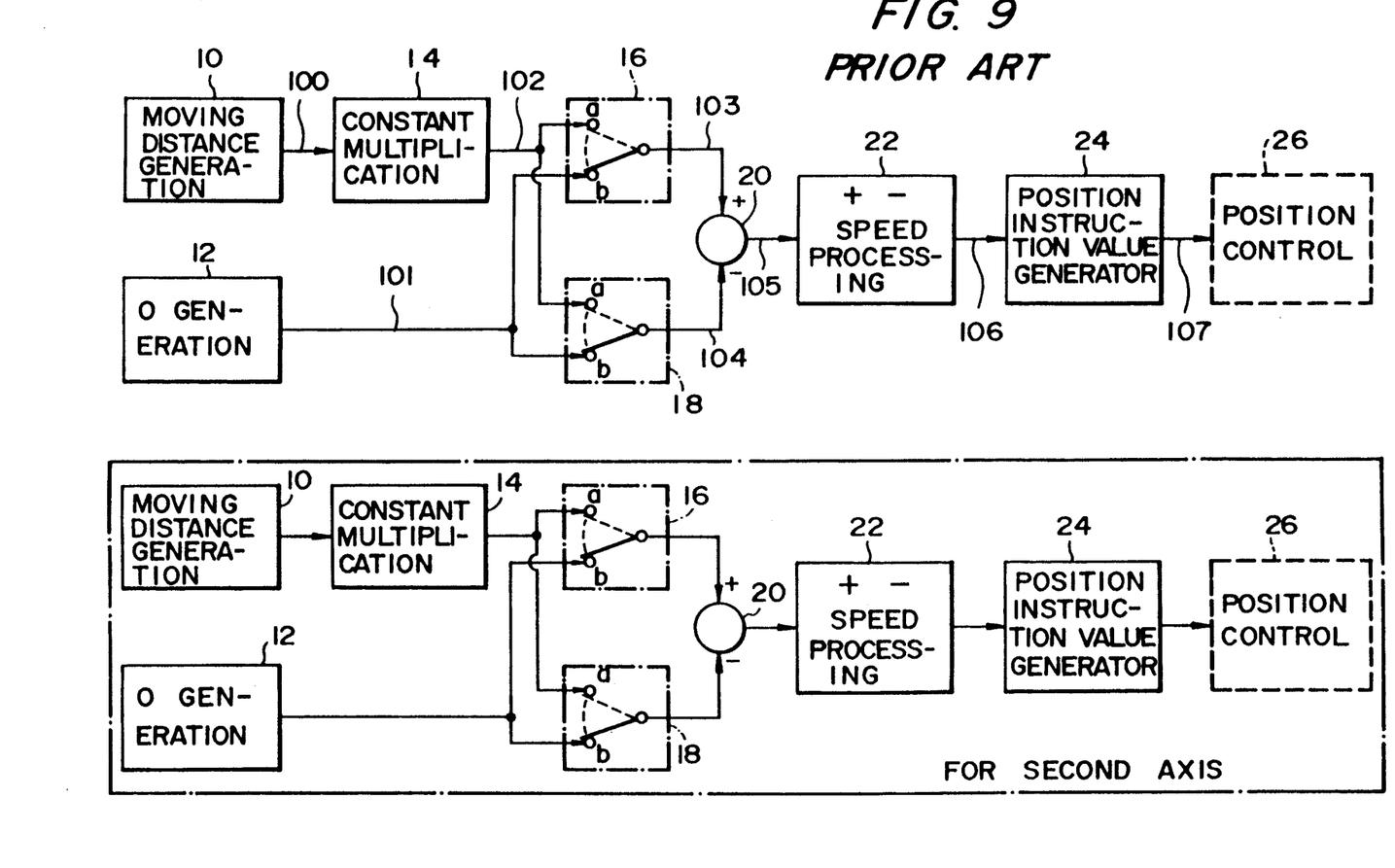
FIG. 9 is a block diagram of a conventional positional control apparatus.

In FIG. 9, there is shown a conventional positional control apparatus in which a movable part can be quickly moved at a certain feeding speed determined by a feed override switch during pushing of a manual feed button in a manual operation mode. The positional control apparatus includes a moving distance generation means 10 for generating a moving distance LO per unit time corresponding to a predetermined manual feeding speed and a moving distance zero generation means 12 for generating a moving distance zero (0) per unit time for stopping manual feeding. The moving distance generation means 10 outputs a signal 100 and the moving distance zero generation means 12 outputs a signal 101. The moving distance generation means 10 is connected to a constant multiplication means 14 for selecting a constant (one of constants of usually 10 to 15 stages) for changing the feeding speed and multiplying the signal 100 by the selected constant to produce a signal 102. The constant multiplication means 14 is connected to an a contact point of a plus direction manual feed button switch 16 and an a contact point of a minus direction manual feed button switch 18. These button switches 16 and 18 are each normally connected to b contact points and are connected to the a contact points while the buttons are being pressed. Similarly, the moving distance zero generation means 12 is coupled with the b contact points of the button switches 16 and 18. In this case, an interlock (not shown) is provided for preventing the actuation of the two button switches 16 and 18 when the two button switches 16 and 18 are pressed at the same time. The button switches 16 and 18 output respective signals 103 and 104 to a subtracter 20 for subtracting the signal 104 from the signal 103, and the subtracter 20 outputs a subtraction result signal 105 to an acceleration and deceleration (+and−speed) processing part 22 for restraining an occurrence of a large acceleration or torque due to a step-form variation of the feeding speed by the on/off operation of the button switches 16 and 18 by using a suitable acceleration or deceleration method.

The acceleration and deceleration processing part 22 outputs a signal 106 to a position instruction value generator 24 for integrating the moving distances per unit time, instructed up to now to generate a necessary position instruction value, and the position instruction value generator 24 outputs a signal 107 to a position control part 26 for carrying out positional control of a control axis. In this case, the signal 105 is output from the subtracter 20 only in the manual operation mode. The above-described construction is provided for the first axis, and the same construction is formed for the second or third axis, FIG. 9 showing only the construction for the first and second axes.

Figure 10:
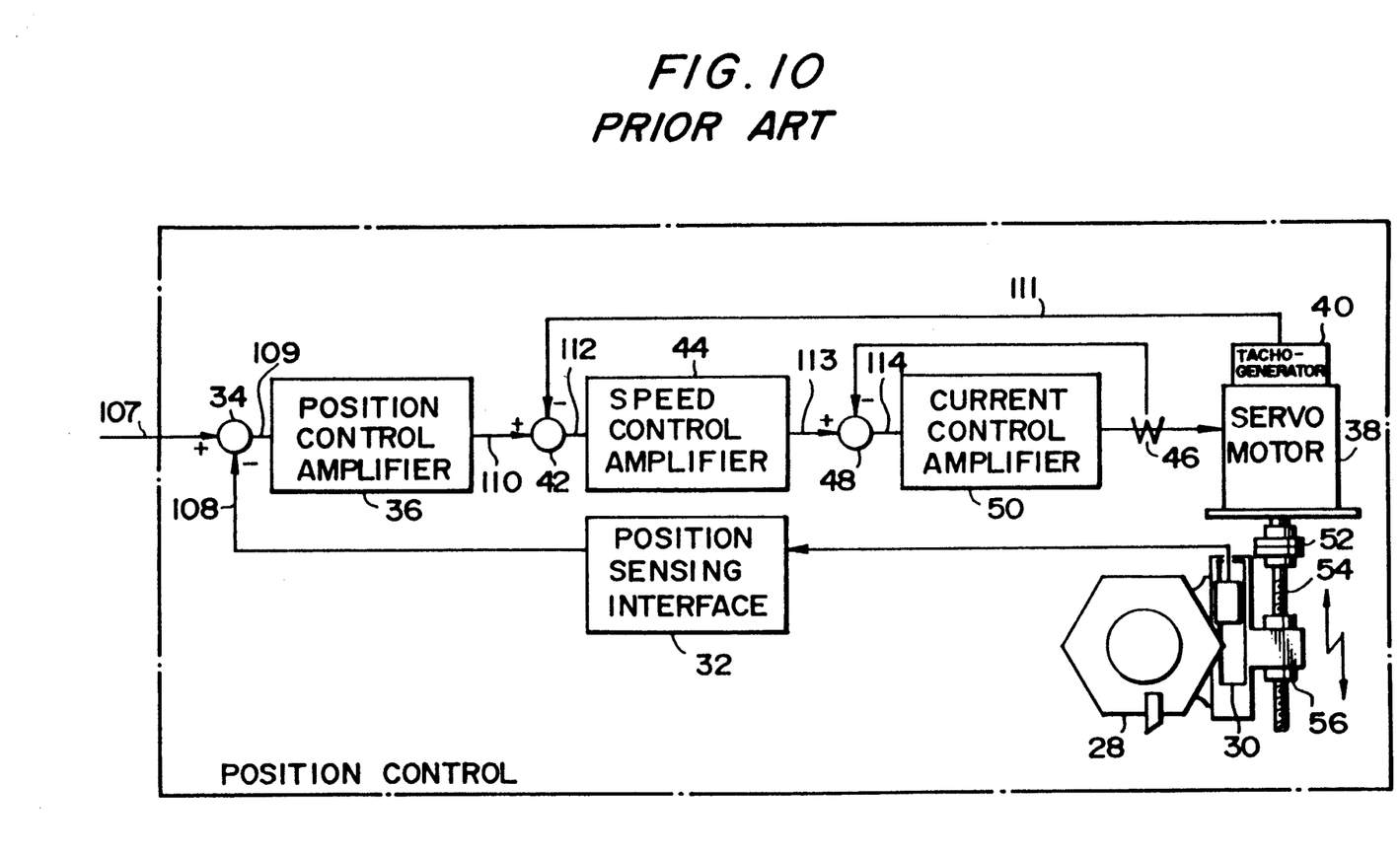
FIG. 10 is a block diagram of a conventional positional control part shown in FIG. 9.

There is shown in FIG. 10 the conventional position control part 26. In the position control part 26, a position sensor 30 for detecting the position of a turret 28 such as a bit holder sends a present position signal 108 to a subtracter 34 through a position sensing interface 32, and the subtracter 34 subtracts the present position signal 108 from the position instruction value 107 output by the position instruction value generator 24 and outputs a subtraction result signal 109 to a position control amplifier 36 for amplifying the output signal 109. The position control amplifier 36 outputs a signal 110 to a subtracter 42, and the subtracter 42 subtracts a signal 111 output by a tacho-generator 40 for detecting a rotating speed of a servo motor 38 from the signal 110 output from the position control amplifier 36 and outputs a subtraction result signal 112 to a speed control amplifier 44 for amplifying the output signal 112. The speed control amplifier 44 outputs a signal 113 to a subtracter 48. The subtracter 48 is connected to a current control amplifier 50, and a current detector 46 detects a current fed from the current control amplifier 50 to the servo motor 38 and outputs a detected current value to the subtracter 48. The subtracter 48 subtracts the current value detected by the current detector 46 from the signal 113 output by the speed control amplifier 44 and outputs a subtraction result signal 114 to the current control amplifier 50. The shaft of the servo motor 38 is coupled with a ball screw shaft 54 via a coupling 52, and a ball screw part 56 secured to the turret 28 is engaged with the ball screw shaft 54. Hence, by rotating the ball screw shaft 54, the turret 28 is moved to and fro in a direction shown by an arrow. Now, assuming that the control amplifiers 36, 44 and 50 are linear amplifiers, the turret 28 can be moved until the present position signal 108 finally becomes equal to the position instruction value 107.

Next, one embodiment of a tool offset setting for initial work processing using a numerically controlled (NC) lathe will be described as follows.

For the explanation, an axis parallel with the rotational central line of a job to be processed is defined as a Z axis and an axis perpendicular to the central line is defined as an X axis. A shift ($\Delta Z = Z_1 - Z_0$, $\Delta X = X_1 - X_0$) of an actual tool position ($Z = Z_1$, $X = X_1$) positioned by actually giving $Z = 0$, $X = 0$ and position instructions from a program origin ($Z = Z_0$, $X = X_0$) determined during programming is called a tool offset, and the tool offset is determined by an operator so that a previously formed cutting program may be used as it is without changing Z and X position instructions formed on the basis of the program origin within the cutting program for each separate job.

In order to determine tool offsets of tools to be used, the operator in place performs processing of the job mounted in a chuck by operation of the feed override switch and the manual feed button or operation of the pulse handle with attention to interference of the tools, and its dimension is measured by using slide calipers or the like and is input to the NC device by using keys on an operational panel. Hence, as in the case when initialising the NC lathe, when a number of tools are mounted or exchanged, this is a considerable number of work steps which places a burden on the operator. Therefore, nowadays, a tool edge measuring instrument is provided on the NC lathe in place of the job processing and the direct measurement of its dimensions. For obtaining the tool offset, the edge of the tool is moved near a sensor of the tool edge measuring instrument by the operation of the feed override switch and the manual feed button or the operation of the pulse handle, and then the tool offset setting in either a Z-axis or the X-axis direction is selected by a switch or the like to start a measuring cycle for moving the tool at a predetermined feeding speed. At the time when the tool edge contacts the sensor at this feeding speed, the NC device automatically calculates and sets the tool offset of the tool.

Figure 11:
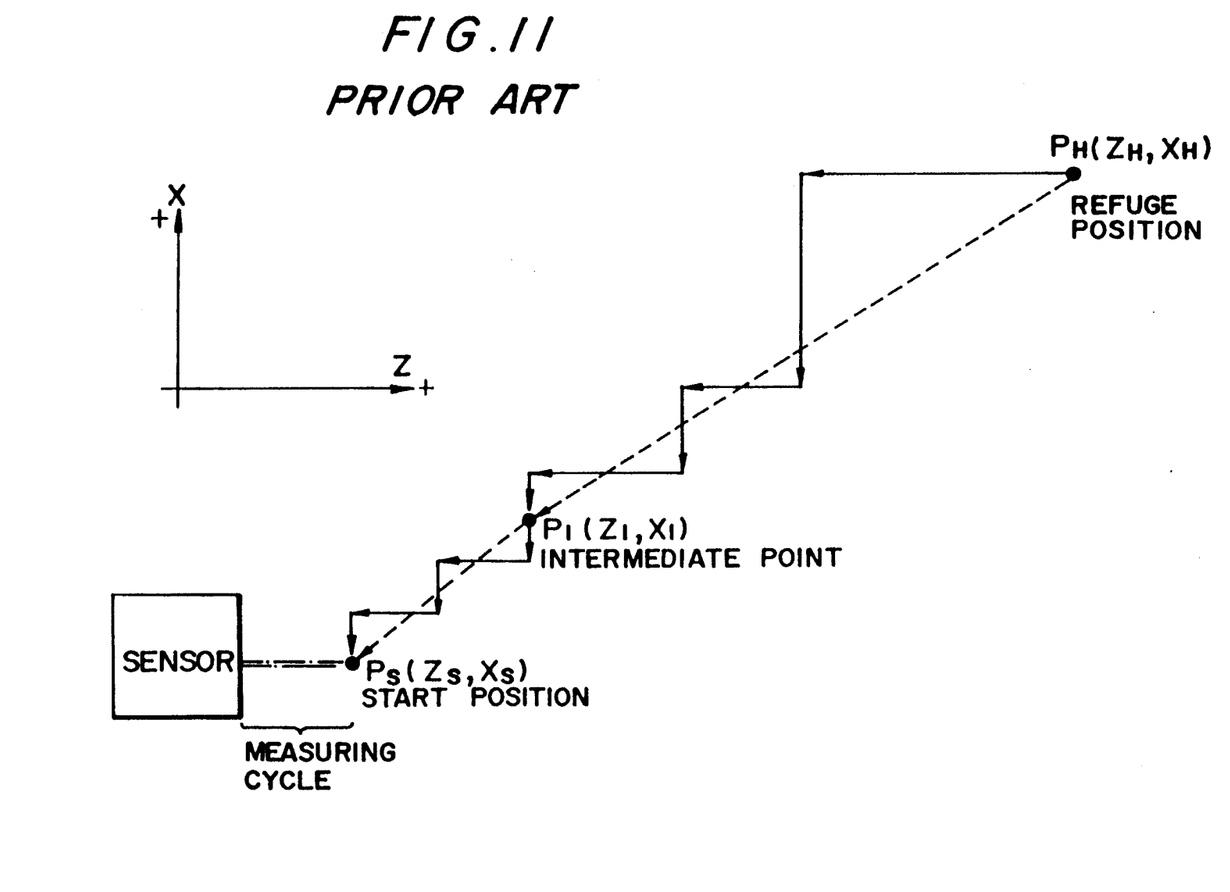
FIG. 11 is a schematic view explaining a conventional automatic measuring function.

FIG. 11 illustrates the operation of the conventional NC device having the tool edge measuring function. Now, the operation is totally carried out in the manual operation mode. In FIG. 11, $P_H(Z_H, X_H)$, $P_1(Z_1, X_1)$ and $P_S(Z_S, X_S)$ are a normal inoperative position of the tool, an intermediate position and an automatic measuring start position, respectively. First, by considering that there is no tool interference up to the intermediate position $P_1(Z_1, X_1)$, a relatively quick feeding speed is selected by the feed override switch, and the tool edge is positioned to the intermediate position $P_1(Z_1, X_1)$ by operating the manual feed button in a minus (−) Z-axis or minus (−) X-axis direction. In FIG. 11, a broken line indicates the shortest distance and a solid line shows an actual moving locus of the tool edge. Then, moving to the automatic measuring start position $P_S(Z_S, X_S)$ near the sensor, a slow feeding speed is selected by the feed override switch in order to pay attention to the tool interference, and the tool edge is positioned to the automatic measuring start position $P_S(Z_S, X_S)$ by operating the manual feed button in the − Z-axis or the − X-axis direction. In this case, since the tool offset setting in the Z-axis direction is supposed, the interval between the sensor and the tool edge is formed in the Z-axis direction. In turn, when the tool offset setting in the X-axis direction is assumed, the interval between the sensor and the tool edge is formed in the X-axis direction.

Next, either in the tool offset setting in the Z-axis direction, the button in the plus (+) or minus (−) Z-axis direction is selected and pushed or in the tool offset setting in the X-axis direction, the button in the + or − X-axis direction is selected and pushed, and the measuring cycle for moving the tool at the predetermined feeding speed is started. In this measuring cycle, the NC device detects the time when the tool edge contacts the sensor at the above-described feeding speed, and at this time, the tool position is accurately calculated to automatically determine the tool offset of the tool. In FIG. 11, one-dotted-lines indicate the motion of the measuring cycle.

Figure 12:
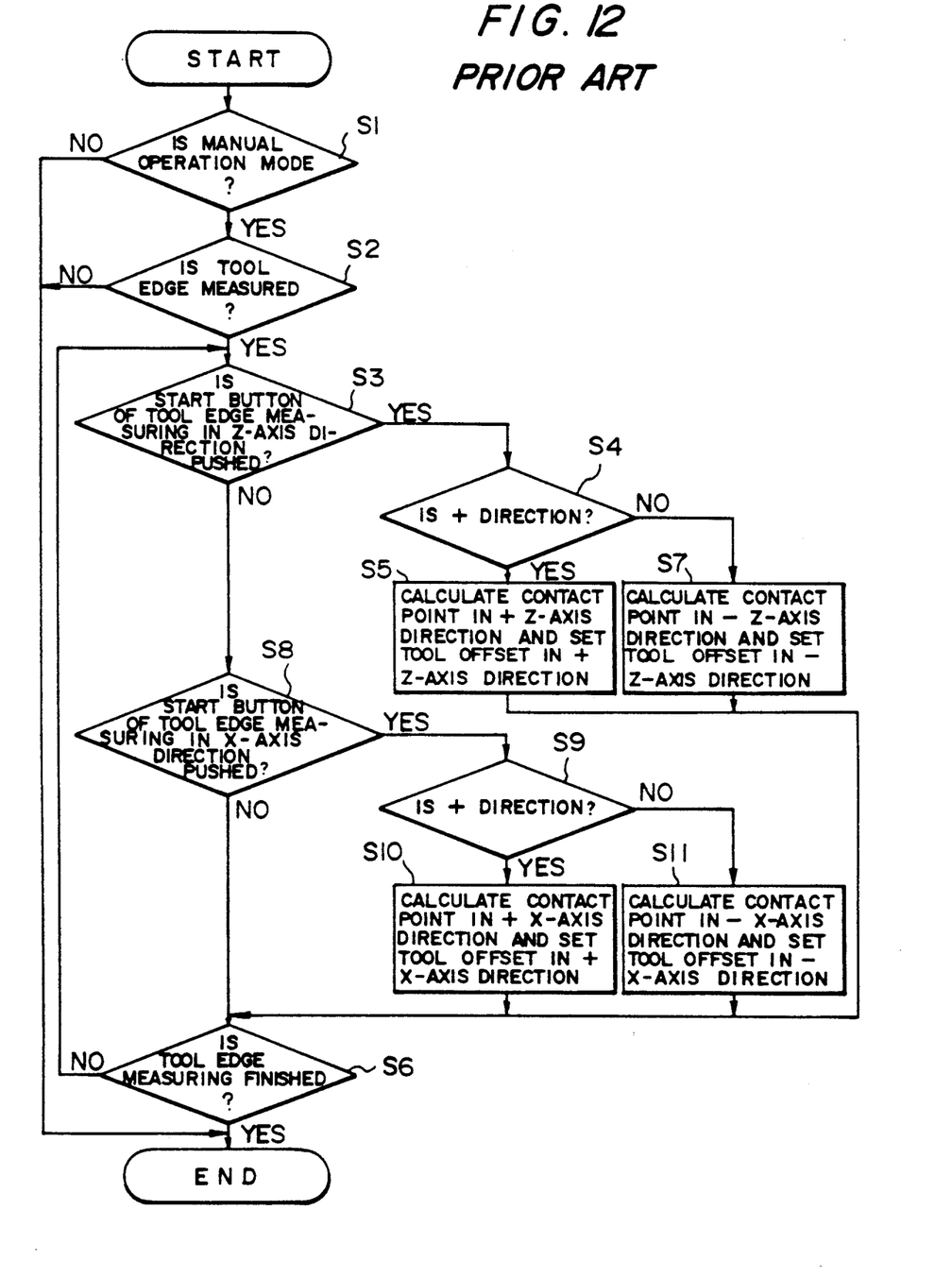
FIG. 12 is a flow chart showing an operation of the conventional positional control apparatus shown in FIG. 9.

Next, the conventional tool edge measuring operation will be described in connection with a flow chart shown in FIG. 12.

The NC device discriminates whether or not it is in manual operation mode in step S1. When it is discriminated that it is not in the manual operation mode, the operation is finished. When it is discriminated that it is in the manual operation mode, it is discriminated whether or not tool edge measurement is to be performed in step S2. When it is discriminated that the tool edge measurement is not being carried out, the operation is finished. When it is discriminated that the tool edge measurement is being performed, a positioning of the tool in the X-axis and Z-axis directions is carried out by operating the feed button and the pulse handle in order to set the tool offset in the X-axis and Z-axis directions. Then, it is discriminated whether or not a start button for the tool edge measurement in the Z-axis direction has been pressed in step S3. When it is discriminated that the start button for the tool edge measurement in the Z-axis direction has been pressed, it is discriminated whether or not a plus (+) direction is pressed in step S4. When it is discriminated that the + direction is pressed, a contact point in the + Z-axis direction is calculated and the tool offset in the + Z-axis direction is set in step S5. Next, it is discriminated whether or not the tool edge measurement is finished in step S6. When it is discriminated that the tool edge measurement is finished, the tool edge measurement is terminated. When it is discriminated that the tool edge measurement is not finished, the operation is returned to step S3. Further, when it is discriminated that the + direction is not pressed in step S4, a contact point in a minus (−) Z-axis direction is calculated and the tool offset in the − Z-axis direction is set in step S7. Then, the operation is moved to step S6 and the steps followed thereby are carried out. Also, when it is discriminated that the start button for the tool edge measurement in the Z-axis direction is not pushed in step S3, it is discriminated whether or not a start button for the tool edge measurement in the X-axis direction is pushed in step S8. When it is discriminated that the start button for the tool edge measurement in the X-axis direction is pushed, it is discriminated whether or not the + direction button is pushed in step S9. When it is discriminated that the + direction button is pushed, a contact point in the + X-axis direction is calculated and the tool offset in the + X-axis direction is set in step S10. Then, the operation is moved to step S6, as described above. In turn, when it is discriminated that the + direction button is not pressed in step S9, a contact point in the − X-axis direction is calculated and the tool offset in the − X-axis direction is set in step S11. Then, the operation is moved to step S6 and the steps followed thereby are carried out, as described above.

As described above, in the conventional NC device having the tool edge measurement function, the movable part holding the tool or the like is moved by the operation of the feed override switch and the manual feed button or the operation of the pulse handle. In the case of operation of the pulse handle, the feeding speed is very slow compared with the operation of the feed override switch and the manual feed button. Further, in an NC device such as a machining center for performing a position control of a movable part holding tools or the like by composing three axes, since the operator has only two hands, three pulse handles for the three axes can not be operated at the same time. The reason why such a problem concerning the operability can not be improved upon until now is as follows. That is, since the NC device recognizes the positions of the parts by numerical data, when the operator does not know the desired target position in terms of a sufficiently accurate numerical value, it is considered that a certain extent of operability sacrifice is permissible because of the nature of the NC device, and further, since a purpose can be accomplished simply by pushing a start button in a machine tool using the NC device when a cutting program used in quantity production is completed, complicated operation for the moving functions of the movable part at the time of the preparation of the above-described initial setting or the initial setting change do not need to be carried out by the operator. Further, in the NC lathe for controlling one turret by two axes, in order for the operator to quickly move the tool edge, problems arise because that is, it is difficult to operate the two manual feed buttons for the Z- and X-axis at the same time because he only has two hands. Namely, the operation of the two axis can be only performed separately, and the manual feeding speed for each axis can not be continuously changed by the feed override switch. As, at the present time, shortening of job processing time is fairly advanced and the ability to process the jobs of a variety of articles in a small amount of time is desired, the reduction of the time needed for the preparation of the initial setting and the initial setting change becomes very significant.

SUMMARY OF THE INVENTION

It is therefore an object of the present invention to provide a positional control apparatus in view of the problems of the prior art, which is capable of readily moving a movable part of an NC device in any desired direction by using a particular handle, reducing time required to carry out initial setting preparation and an initial setting change, readily setting a tool interference area without input errors, preventing undesired operation of the handle and improving safety.

In accordance with one aspect of the present invention, there is provided a positional control apparatus having a movable part the position of which is moved by either one control axis or a composition of either two orthogonal control axis or three control axis to be controlled by an NC device, comprising: a handle movably held to the movable part by a holding part; condition confirmation means for detecting whether or not an operator grips the handle; force detecting means for detecting the strength of force given to the handle when the operator gripping the handle moves it in any direction; direction detecting means for detecting the direction of the force given to the handle when the operator gripping the handle moves it in any direction; and axial moving amount calculation means for calculating a moving amount of each control axis in consideration of the strength and the direction of the force detected by the force and direction detecting means as a strength and a direction of an acceleration given to the movable part when the condition confirmation means discriminates that the operator grips the handle, thereby the positional control of the movable part is performed by the moving amount of each control axis obtained by the axial moving amount calculation means.

In the positional control apparatus of the present invention, on the basis of the above-described construction, the condition confirmation means detects whether or not the operator grips the handle.

When the operator gripping the handle moves the handle in any desired direction, the force detecting means detects the strength of the force given to the handle, and the direction detecting means detects the direction of the force given to the handle.

When the condition confirmation means discriminates that the operator grips the handle, the axial moving amount calculation means performs the calculation of the moving amount of each control axis in consideration of the strength and the direction of the force, detected by the force detecting means and the direction detecting means as the strength and the direction of the acceleration given to the movable part.

By the moving amount of each control axis, obtained by the axial moving amount calculation means, the positional control of the movable part is carried out.

The handle can include a grip part to be gripped by the operator; a shaft part having one end rotatably supported by the movable part; and an arm part for connecting the grip part and the shaft part.

The condition confirmation means may be arranged within the grip part of the handle.

The condition confirmation means can include a grip confirmation switch having two contact points, to be in a conductive state when a push switch is turned on by a gripping force by gripping the grip part; two slip rings to be connected to the two contact points of the grip confirmation switch via a cable; two slip ring brushes to be contacted with the two slip rings; and a conduction sensor connected to the two slip ring brushes for detecting a conduction signal of the grip confirmation switch.

The force detecting means may be arranged within the grip part of the handle.

The force detecting means can be a strain gauge arranged between the grip pipe and the grip shaft, and the strain gauge detects the force that the operator gives to the handle as components in directions perpendicular to the grip shaft and intersecting each other at right angles.

The direction detecting means can be arranged in the shaft part and detects the direction of the force by a photo pulse sensor for detecting a rotation angle of the handle with respect to the movable part and the force detecting means.

The axial moving amount calculation means may be arranged within the arm part of the handle.

BRIEF DESCRIPTION OF THE DRAWINGS

The above and other objects, features and advantages of the present invention will more fully appear from the following description of the preferred embodiments with reference to the accompanying drawings, in which.

DESCRIPTION OF THE PREFERRED EMBODIMENTS

Figure 1:
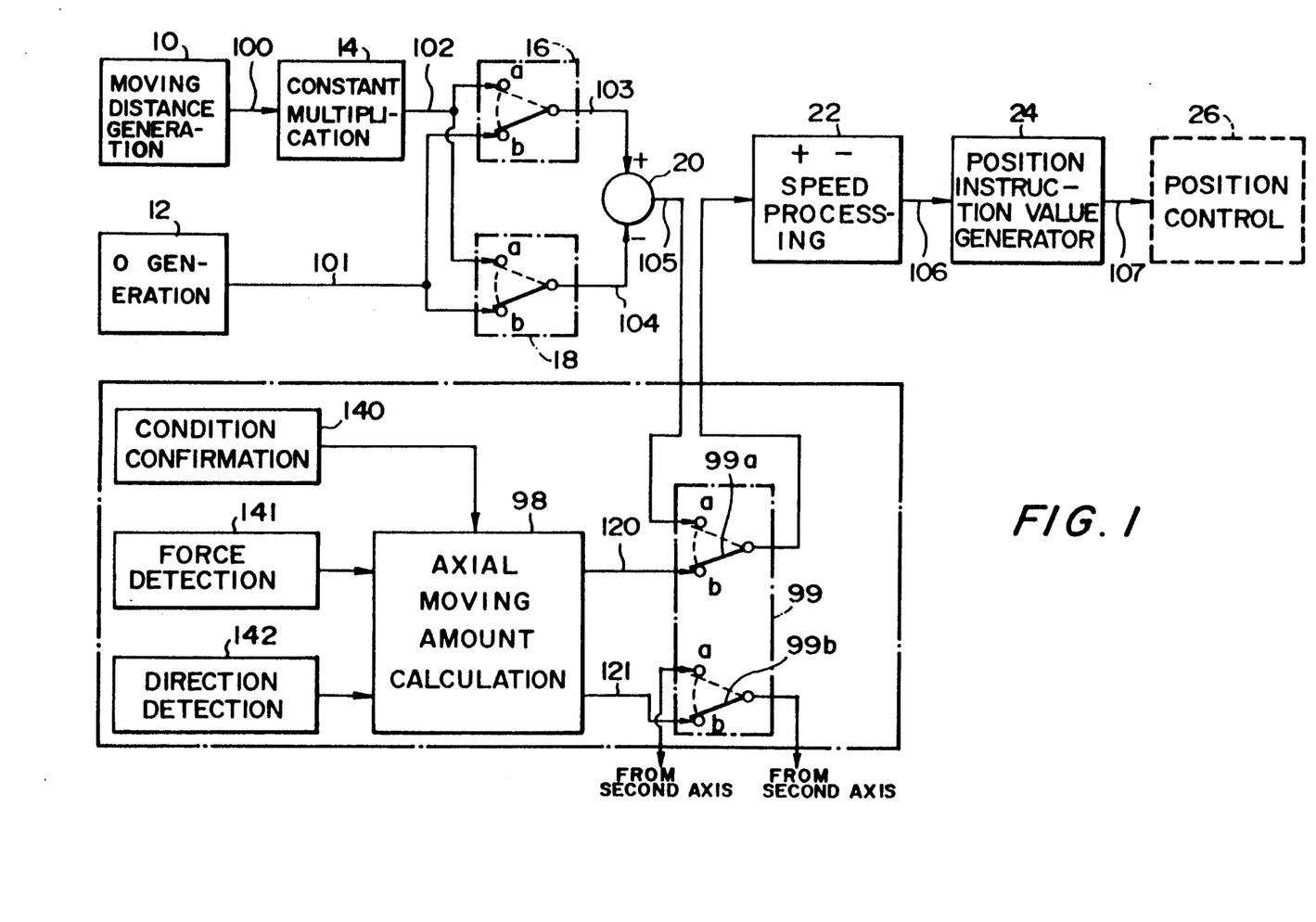
FIG. 1 is a block diagram of a positional control apparatus according to the present invention.
Figure 2:
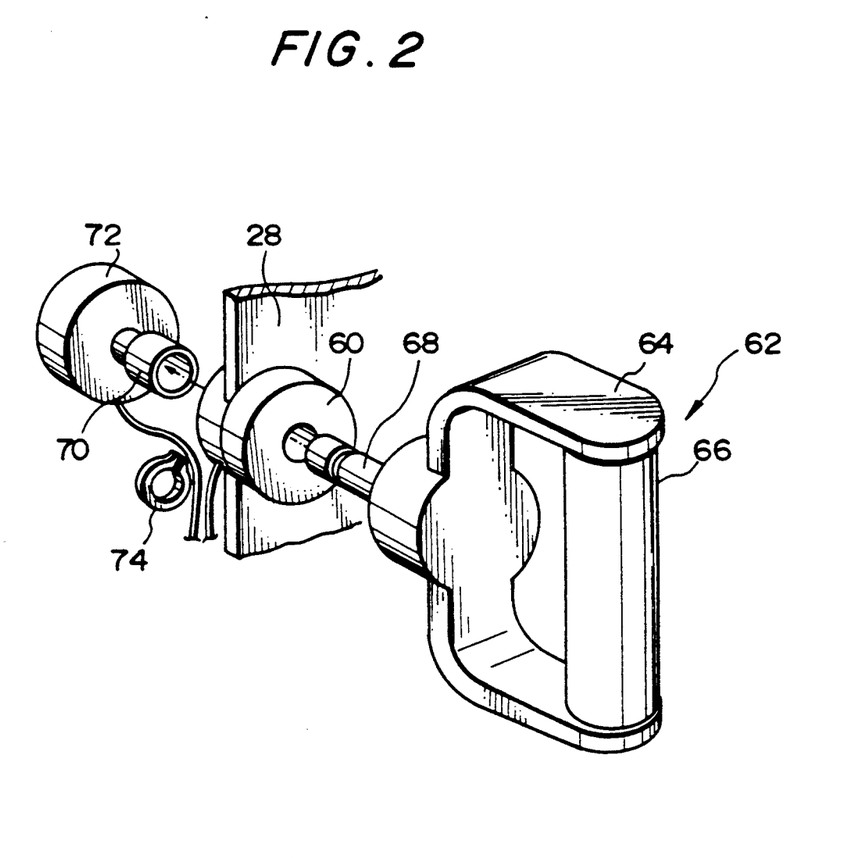
FIG. 2 is a perspective view of an essential part of the positional control apparatus shown in FIG. 1.
Figure 3:
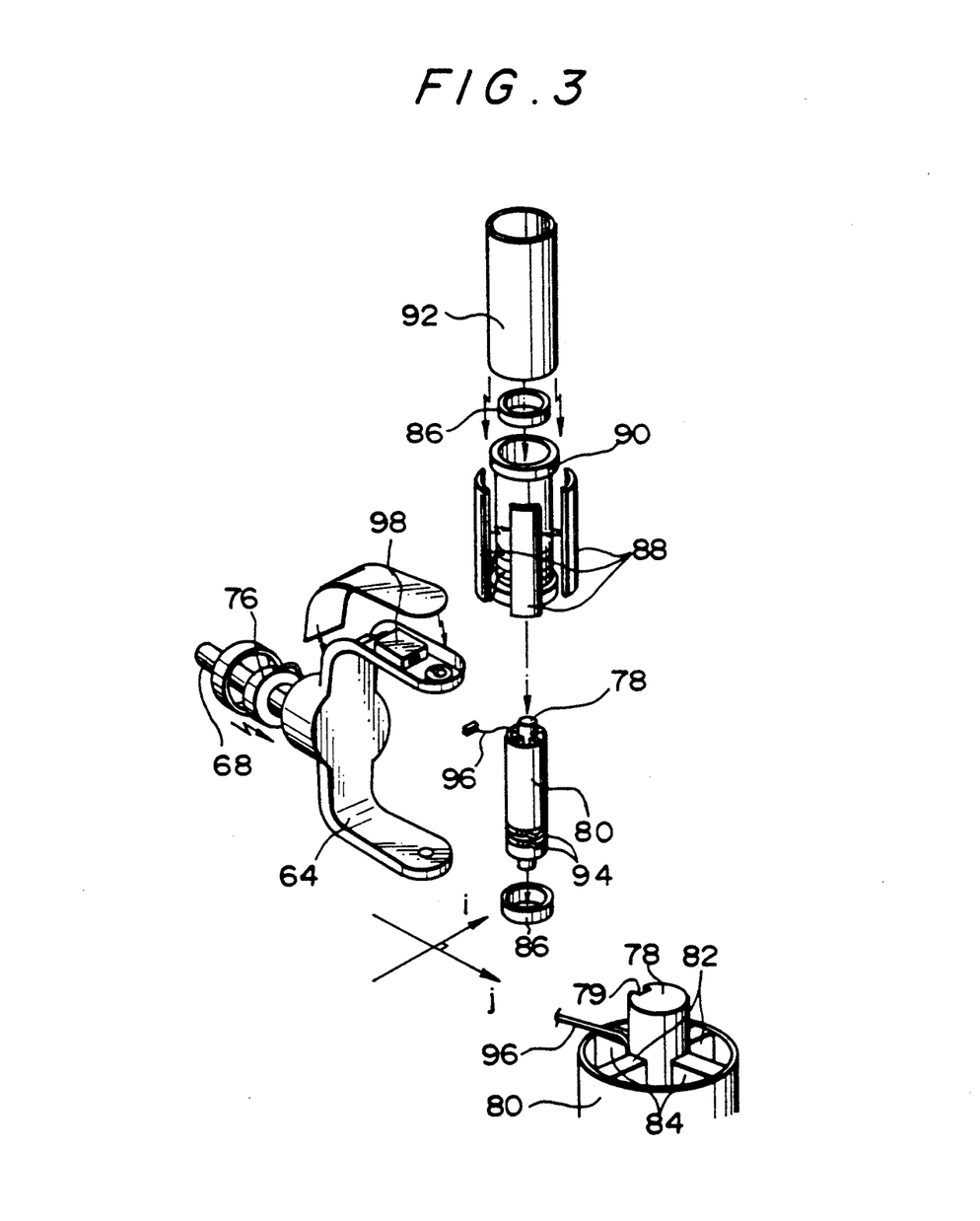
FIG. 3 is an exploded view of a handle part of the positional control apparatus shown in FIG. 1.

The present invention will now be described in connection with its preferred embodiments with reference to the accompanying drawings, wherein the same parts as those described above in connection with the conventional apparatus are designated by the same reference characters and thus the repeated description thereof can be omitted for brevity. In FIGS. 1 to 3, there is shown one embodiment of a positional control apparatus according to the present invention.

As shown in FIG. 2, in the positional control apparatus, a handle 62 comprises a U-shaped arm part 64, a grip part 66, to be gripped by a hand of an operator, constructed between the ends of the U-shaped arm part 64, and a shaft part 68 secured to the bottom part of the U-shaped arm part 64. The handle 62 is held to a turret 28 (see FIG. 10) as a movable part by a holder part 60 so as to be rotatable and movable in the axial direction of the shaft part 68. A rotation angle sensor 72 such as a photo pulse sensor for detecting a rotation angle of the handle 62 is connected to the end of the shaft part 68 via a coupling 70, and a snap ring 74 is fitted on a circular groove formed on the surface of the shaft part 68 in order to prevent the shaft part 68 from falling out of a central opening of the holder part 60.

Further, as shown in FIG. 3, assuming that the central axis direction of the shaft part 68 is a j-axis and the direction perpendicular to the central axis direction is an i-axis, a rotary transformer 76 is mounted between the holder part 60 and the handle 62 within the same, and the rotary transformer 76 not only transmits an axial moving amount signal but also supplies necessary electric power to the other parts. The grip part 66 includes a grip shaft 78 having a key way 79 for preventing the grip shaft 78 from rotating with respect to the U-shaped arm part 64, and a pipe 80 of thin thickness is mounted on the grip shaft 78 via force sensors 82 and 84 arranged there-between. That is, between the grip shaft 78 and the thin thickness pipe 80, there are provided two i-axis direction force sensors 82 serving both as force detecting means and direction detecting means for detecting the force and direction of the thin thickness pipe 80 against the grip shaft 78 in the i-axis direction and two j-axis direction force sensors 84 for serving both as force detecting means and direction detecting means for detecting the force and direction of the thin thickness pipe 80 against the grip shaft 78 in the j-axis direction. In this case, the force sensors 82 and 84 can constitute a strain gauge. A pair of bearings 86 are arranged on both the ends of the thin thickness pipe 80 so as to form space for preventing the thin thickness pipe 80 from being subjected to the torque transmitted from the grip pipe 90. Also, two or more slip ring brushes 94 for a grip confirmation switch are attached to the external surface of the thin thickness pipe 80, and the thin thickness pipe 80 is covered by the grip pipe 90. The grip pipe 90 is formed with two or more slip rings cut on the internal surface, the slip rings contacting with the slip ring brushes 94, and four grip confirmation switches 88 are mounted on the external surface of the grip pipe 90. When the operator grips the grip part 66, the grip confirmation switches 88 become conductive and discriminate the gripping of the grip part 66 by the operator to constitute condition confirmation means. Further, the grip pipe 90 and the grip confirmation switch plates 88 are covered by a grip rubber cover 92 for improving a touch feel on gripping. The signals picked up by the four grip confirmation switches 88 are output to a sensor cable 96 via the slip rings on the internal surface of the grip pipe 90 and the slip ring brushes 94 attached on the thin thickness pipe 80. The signals output from the force sensors 82 and 84 are output to a sensor cable 98. On the other hand, the U-shaped arm part 64 is provided with an axial moving amount calculation means 98. Of course, the axial moving amount calculation means 98 can be provided on the holder part 60.

Further, as shown in FIG. 1, signals output from a condition confirmation means 140 corresponding to the slip ring brushes 94 for the grip confirmation switch and from force and direction detection means 141 and 142 corresponding to the i-axis and j-axis direction force sensors 82 and 84 are input to the axial moving amount calculation means 98, and the axial moving amount calculation means 98 calculates the moving amounts of the i- and j-axes from these input signals. The axial moving amount calculation means 98 is connected to a positional control mode switching means 99 including first and second switches 99a and 99b, and the positional control mode switching means 99 is linked with two subtracters 20 and two acceleration and deceleration processing parts 22 for the first and second axes. That is, the axial moving amount calculation means 98 outputs first and second signals 120 and 121 to b contact points of the first and second switches 99a and 99b. Further, the signals 105 output by the subtracters 20 for the first and second axes are fed to a contact points of the first and second switches 99a and 99b, and common contact points of the first and second switches 99a and 99b are connected to the acceleration and deceleration processing parts 22 for the first and second axes.

Next, the operation of the above-described positional control apparatus according to the present invention will now be described in detail. In the axial moving amount calculation means 98, the force acting on the movable part is recognized, and in order to give a feeling as if the operator operated the movable part by himself, the following processing is performed. Now, the equivalent mass of the movable part, the force that the operator gives to the handle and the acceleration acting on the movable part are defined as M, F and $\alpha$, respectively. For example, when the operator moves the movable part by giving the force such as only $F_0$, the acceleration $\alpha_0$ is applied to the movable part and at this time the following formula is obtained.

$$F_0 = M \cdot \alpha_0 \tag{1}$$

In this case, it is regarded that the friction of the machine and the external force such as servo clamp and the like are not considered. In formula (1), $F_0$ is very small compared with M, and hence the movable part can not be moved. At this time, the acceleration $\alpha_{o1}$ generated at the movable part by the force $F_0$ given to the handle can be set by determining the equivalent mass M of the movable part. Thus, the equivalent mass M of the movable part is predetermined by an experiment or the like in consideration of operational feeling. In this instance, the following formula is satisfied.

$$F_0 = M \cdot a_{o1} \tag{2}$$

Hence, the operator can feel as if he has lightly operated the movable part by only the force $F_0$ given to the handle. In order to realize this fact, in the axial moving amount calculation means 98, the calculation is carried out on the following principle. That is, assuming that the force to be given to the handle by the operator is $F_0$, the force $F_0$ is represented by a resultant force of a first force F0i ($|F0i|$, $\theta$) represented by a force strength detected by the i-axis direction force sensors 82 and the rotation angle $\theta$ around the j-axis as the rotation center, detected by the rotation angle sensor 72 and a second force F0j having a force strength $|F0j|$, detected by the j-axis direction force sensors 84. Then, when the force that the operator gives to the handle and the acceleration to be generated at the movable part at a certain time t are assumed to be F(t) and $\alpha(t)$, respectively, the following formula is satisfied.

$$\alpha(t) = F(t)/M \tag{3}$$

In this case, M is a predetermined constant. Then, from this acceleration $\alpha(t)$, the speed V(t) and the position P(t) of the movable part can be obtained as follows.

$$V(t) = \int \alpha(t)dt, \quad P(t) = \int V(t)dt \tag{4}$$

However, since the continuous amount is not handled within the NC device, formula (4) is approximated as follows.

$$V(t) = V + \Sigma \alpha(t), \quad P(t) = P + \Sigma V(t) \tag{5}$$

In this instance, V is a speed just before the time t and P is a constant meaning a position just before the time t. Although the above-described processing is performed for each of the axes the NC device controls, at the time when the force F(t) is detected, the force may be decomposed into force components corresponding to the axes the NC device controls and the calculation may be performed for each axis. Alternatively, the position P(t) in the direction of the force F(t) may be firstly obtained, and then the force may be decomposed into moving amounts corresponding to the axes. In this embodiment, the condition confirmation means 140 also has a function of danger prevention. That is, when the operator once gives the force to the handle to move the movable part, the movable part executes a uniform linear motion until the force given to the handle is changed. Hence, the condition confirmation means 140 prevents the continuous moving of the movable part when the operator releases his hold on the handle and automatically stops the position calculation. As a result, the condition confirmation means 140 prevents the operation even if an elbow of the operator or an initial setting tool inadvertently hits the handle.

Figures 4A, 4B:
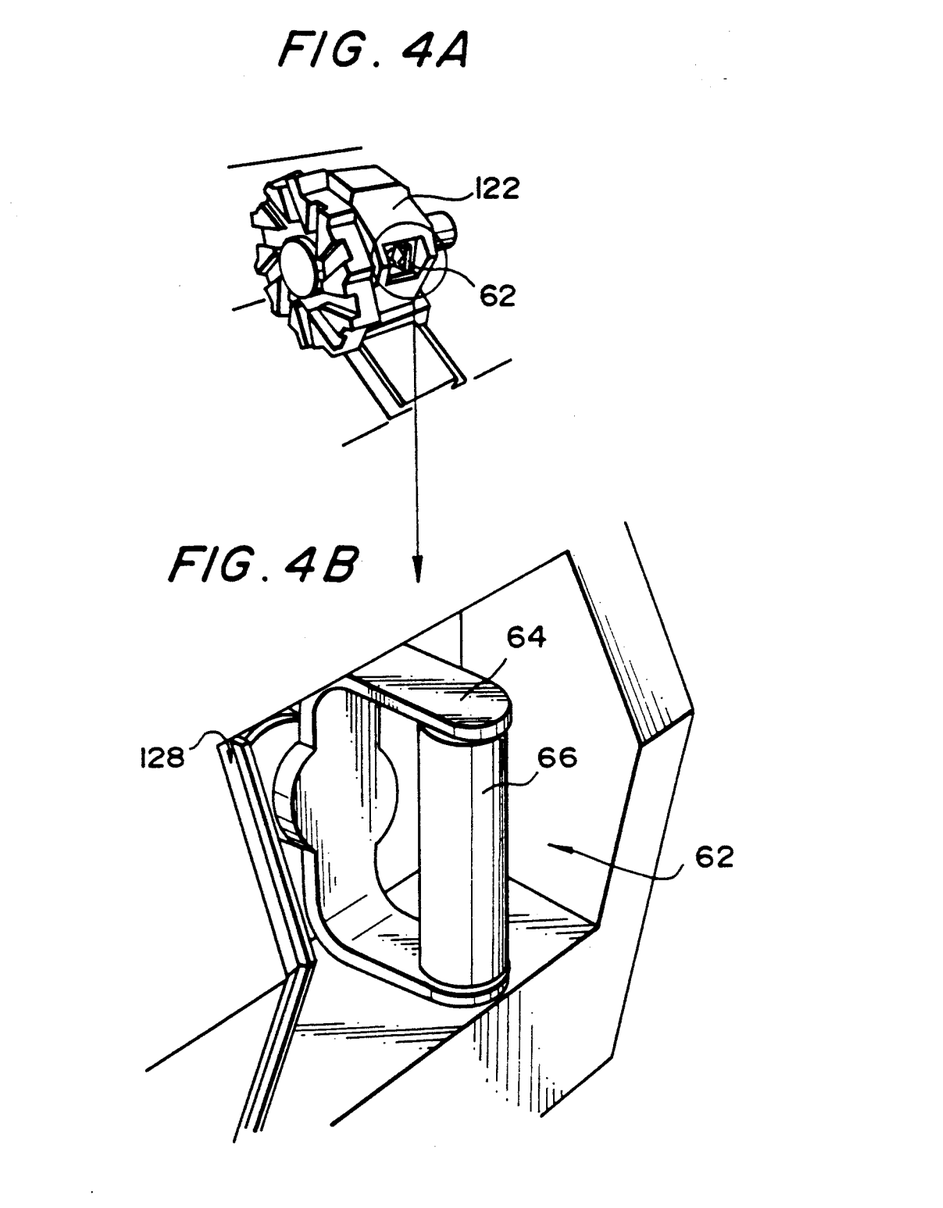
FIGS. 4A and 4B are schematic perspective views of a saddle of an NC lathe to which the positional control apparatus according to the present invention is applied.
Figure 5:
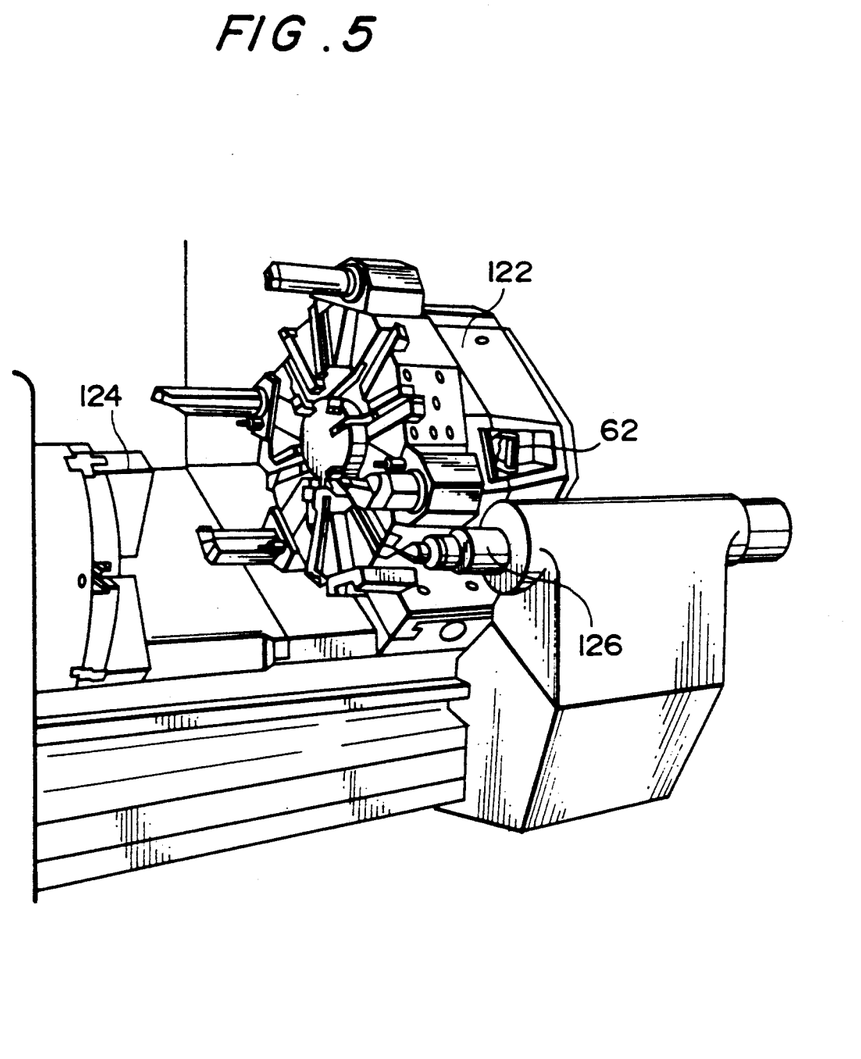
FIG. 5 is a perspective view of an NC lathe having one saddle, to which the positional control apparatus according to the present invention is applied.
Figure 6:
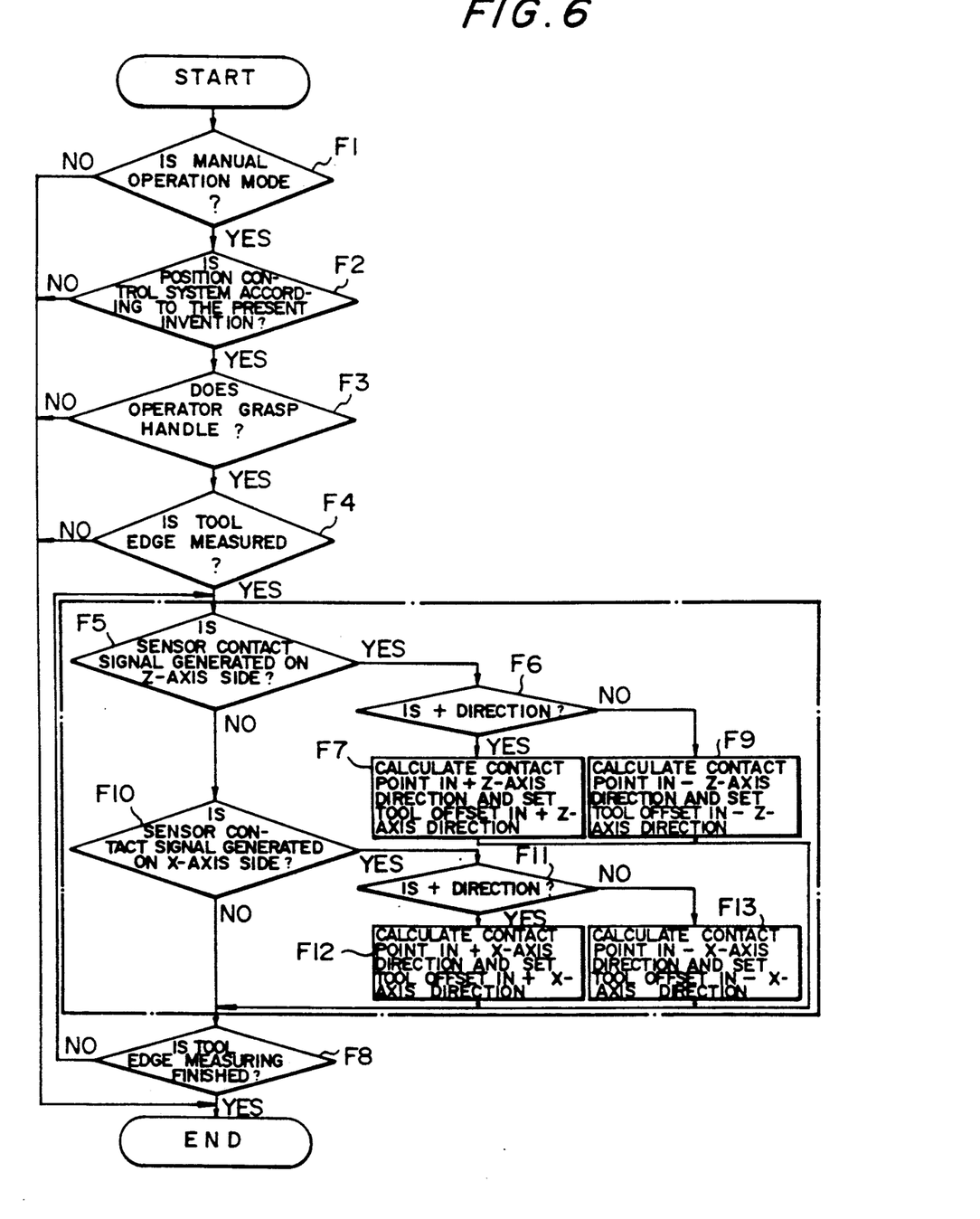
FIG. 6 is a flow chart showing an operation of the positional control apparatus according to the present invention.
Figure 7:
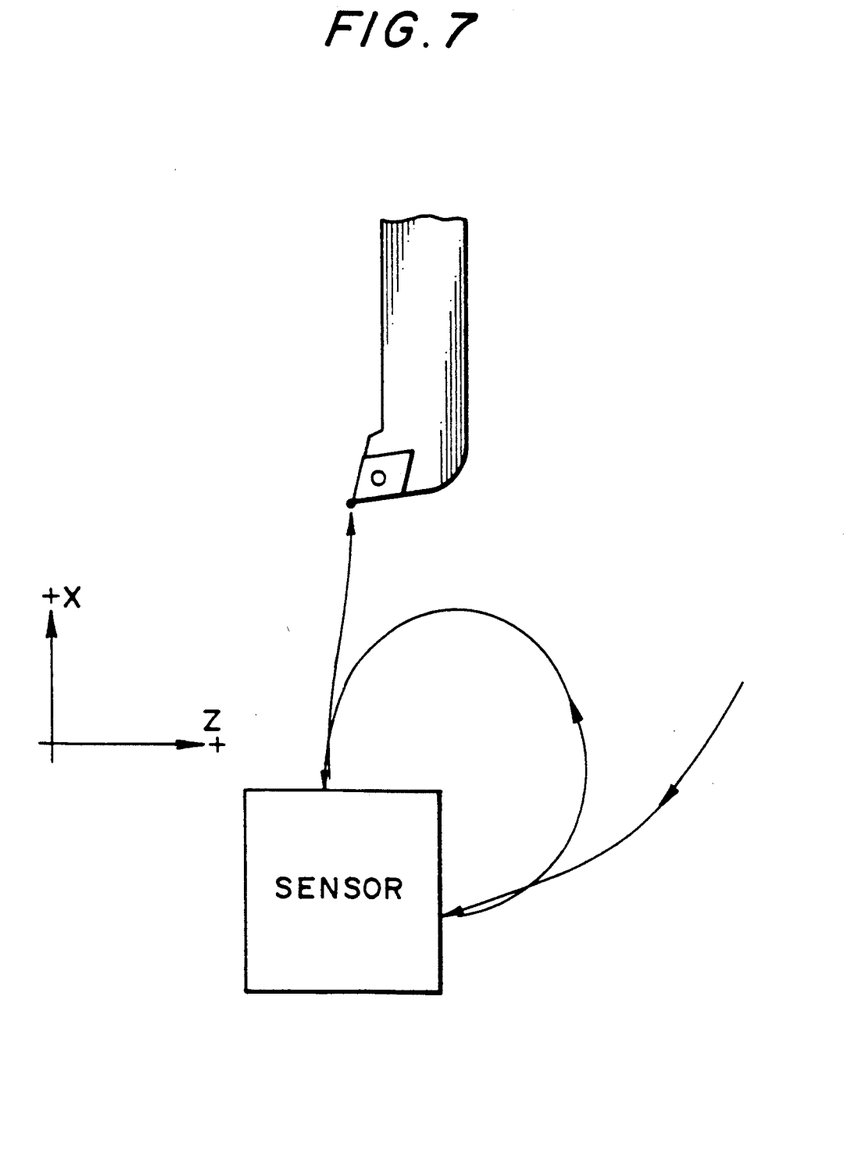
FIG. 7 is a schematic view illustrating the operation of the positional control apparatus according to the present invention.

Next, one embodiment of a positional control apparatus according to the present invention, applied to an NC lathe will be described with reference to FIGS. 4A and 4B to FIG. 7. FIGS. 4A and 4B illustrate a saddle of the NC lathe and FIG. 5 shows the NC lathe having one saddle. FIG. 6 illustrates a flow chart showing the operation of the NC lathe. To a turret 122, no tool is yet attached, and a handle 62 of the present invention is provided on the side surface of the turret 122 and can be covered by a slide cover 128. Though the turret 122 is inclined, since the position is automatically changed by a transformation, as described above, it is not necessary to arrange the j-axis direction of the handle 62 to be completely parallel with the X-axis direction, and the handle can be mounted in any direction so as to be easily held by the operator. For brevity of the explanation, the NC lathe having one saddle is used, as shown in FIG. 5. In FIG. 5, the left hand side is a main spindle side where a chuck 124 for holding a workpiece is provided. A tailstock 126 is installed at the right hand front side, and tools are held on the turret 122. In this case, the NC device performs the positional control of the turret 122 holding the tools and the like by the biaxial composition of the Z- and X-axes. In this embodiment, since only the control of the Z- and X-axes directions is carried out, an axial moving amount in another direction is controlled in advance so as to be prevented within the NC device or, even when such an axial moving amount is generated, the NC device functions so as to ignore it.

Then, the handle 62 is used as follows. That is, as shown in FIG. 6, the operation is switched to the manual operation mode on the operational panel of the NC device in step F1 and is further switched to the positional control apparatus according to the present invention by the position control mode switching means 99 in step F2. Then, the slide cover 128 is opened and the operator grasps the handle 62 and operates it in step F3. When the handle 62 is not used, the slide cover 128 is closed to protect the handle from chips during the cutting operation. When it is discriminated that it is the manual operation mode, it is discriminated whether or not tool edge measurement is performed in step F4. Then, it is discriminated whether or not a sensor contact signal in the Z-axis direction is generated in step F5. When it is discriminated that the sensor contact signal in the Z-axis direction is generated, it is discriminated whether or not the + direction sensor contact signal is generated in step F6. When it is discriminated that the + direction sensor contact signal is generated, a contact point in the + Z-axis direction is calculated and the tool offset in the + Z-axis direction is set in step F7. Next, it is discriminated whether or not the tool edge measurement is finished in step F8. When it is discriminated that the tool edge measurement is finished, the tool edge measurement is terminated. When it is discriminated that the tool edge measurement is not finished, the operation is returned to step F5.

Further, when it is discriminated that the + direction sensor contact signal is not generated in step F6, a contact point in the − Z-axis direction is calculated and the tool offset in the − Z-axis direction is set in step F9. Then, the operation is moved to step F8 and the steps followed thereby are carried out. Also, when it is discriminated that the sensor contact signal in the Z-axis direction is not generated in step F5, it is discriminated whether or not a sensor contact signal in the X-axis direction is generated in step F10. When it is discriminated that the sensor contact signal in the X-axis direction is generated, it is discriminated whether or not the + direction sensor contact signal is generated in step F11. When it is discriminated that the + direction sensor contact signal is generated, a contact point in the + X-axis direction is calculated and the tool offset in the + X-axis direction is set in step F12. Then, the operation is moved to step F8, as described above. In turn, when it is discriminated that the + direction sensor contact signal is not generated in step F11, a contact point in the − X-axis direction is calculated and the tool offset in the − X-axis direction is set in step F13. Then, the operation is moved to step F8 and the steps followed thereby are carried out, as described above.

As described above, even when the operator does not know the precise desired target position in terms of a sufficiently accurate numerical value, by gripping the handle and freely moving the handle in any mechanically movable direction of the turret 122, the strength and the direction of the force which acts between the grip part gripped by the operator and the fixing part for fixing the grip part onto the turret 122 are transformed into the positional instruction value of the axis that the NC device controls by the axial moving amount calculation means 98, and thus the movable part can be quickly moved. In this case, since the operation is instructed by the motion of the hand of the operator himself, the movable part can be directly moved from the normal inoperative position $P_H(Z_H, X_H)$ of the tool to the automatic measuring start position $P_S(Z_S, X_S)$ by the shortest route (see the broken line in FIG. 11). Of course, even by the hand motion of the operator himself, the operator should be sufficiently careful of the tool interference. Next, although by selecting and pressing the button in the + or − Z-axis direction for the tool offset setting in the Z-axis direction or by selecting and pressing the button in the + or − X-axis direction for the tool offset setting in the X-axis direction, the measurement cycle for moving the tool at the predetermined feeding speed can be started, however, the moving of the axis of the measurement cycle is successively performed by the above-described operation of the handle. That is, the time when the tool edge contacts the sensor is detected, and at the same time, it is automatically discriminated whether the sensor contact signal for the tool offset setting is for the Z-axis direction or the X-axis direction, and further whether it is the + side or the − side, and the tool position at this time is accurately calculated so as to automatically determine the tool offset of the tool. If necessary, the maximum feeding speed in the measurement cycle can be restricted to protect the sensor. Although the one-dotted-lines in FIG. 11 indicate the motion of the conventional measurement cycle, according to the present invention, for example, since there is no trouble even if the axis is shifted to the Z-axis direction during the tool offset setting in the X-axis direction, the tool offset setting can be performed while the tool moving with respect to the sensor takes a locus shown in FIG. 7, and thus the usability is largely improved.

Figure 8:
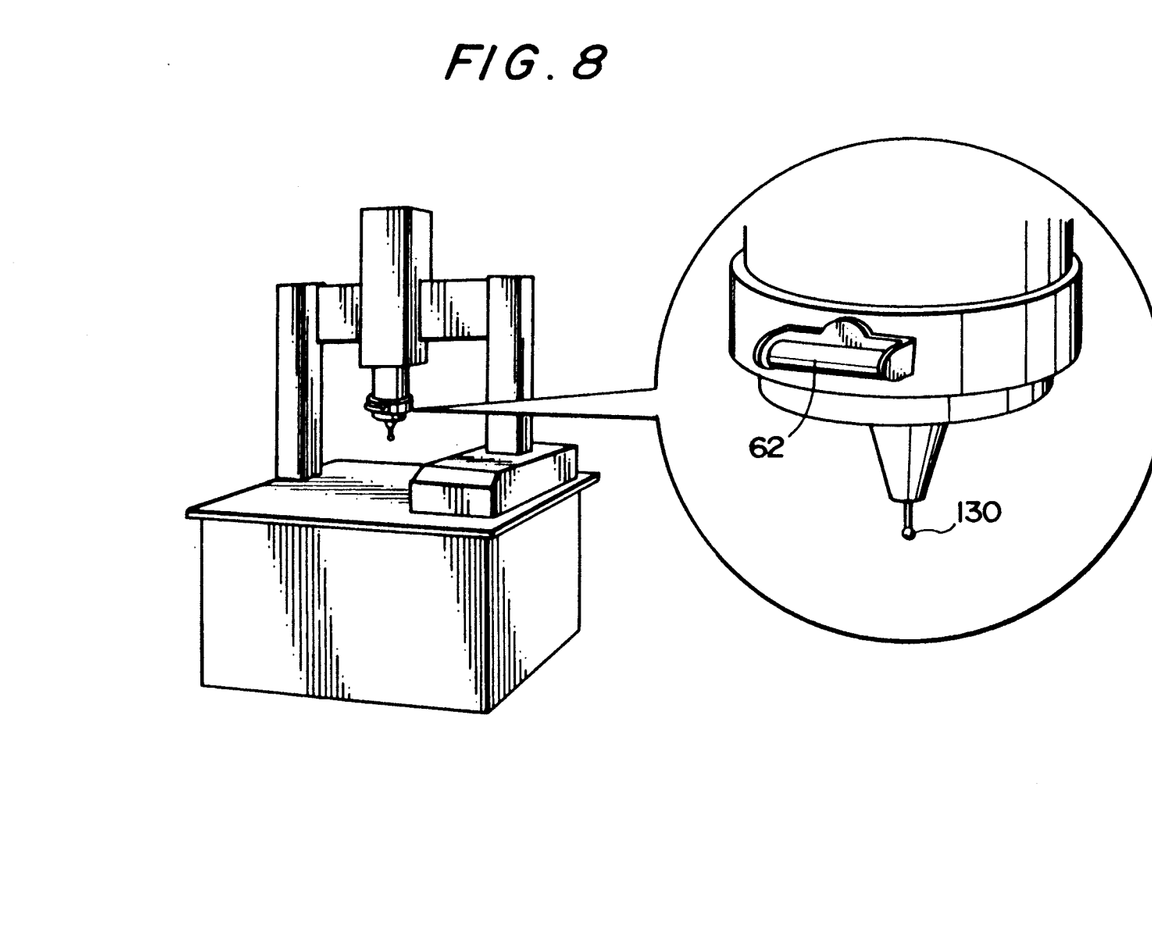
FIG. 8 is a schematic perspective view of a machining center to which the positional control apparatus according to the present invention is applied.

In FIG. 8, there is shown another embodiment of the positional control apparatus according to the present invention, applied to a machining center. In this embodiment, a triaxial control can be carried out, and thus the operator gripping the handle 62 can move the handle 62 in the three-dimensional space. In FIG. 8, after the processing, a touch sensor 130 is held in place of a tool, and a processed workpiece can be quickly measured by the NC device of the machine.

As described above, according to the present invention, a movable part of a positional control apparatus can be readily moved in any desired direction by an operator, and thus the time required for an initial setting preparation and an initial setting change can be largely reduced. Further, while the interference between a chuck and a tool is actually visually checked, the tool can be positioned in a necessary interference area of coordinate position, and a setting of the two- or three-dimensional interference area of the tool and structural parts can be exactly carried out without any input error.

Further, it is detected whether of not the operator grips the handle by the condition confirmation means, and continuous movement caused after the hand has been removed from the handle can be prevented. Hence, even if an elbow of the operator or an initial setting tool hits the handle, the operation is prevented, and thus the safety can be largely improved.

Although the present invention has been described in its preferred embodiments with reference to the accompanying drawings, it is readily understood that the present invention is not restricted to the preferred embodiments and that various changes and modifications can be made by those skilled in the art without departing from the spirit and scope of the present invention.

What is claimed is:

1. A positional control apparatus having a movable part the position of which is moved by either one control axis or a composition of either two orthogonal control axes or three control axes to be controlled by an NC device, comprising:

a handle movably attached to said movable part by a holding part;

condition confirmation means for detecting whether or not an operator grips said handle;

force detecting means for detecting the strength of force given to said handle when the operator gripping said handle moves said handle in any direction;

direction detecting means for detecting the direction of the force given to said handle when the operator gripping said handle moves said handle in any direction; and axial moving amount calculation means for calculating the moving amount of each control axis in consideration of the strength and the direction of the force detected by said force and direction detecting means as a strength and a direction of an acceleration given to said movable part when said condition confirmation means discriminates that the operator grips said handle.

2. The positional control apparatus of claim 1, wherein said handle includes:

a grip part to be gripped by a hand of the operator;

a shaft part having one end rotatably supported by said movable part; and an arm part for connecting said grip part and said shaft part.

3. The positional control apparatus of claim 2, wherein said grip part includes:

a grip shaft fixed to said arm part; and a grip pipe rotatably supported to said grip shaft.

4. The positional control apparatus of claim 3, wherein said condition confirmation means is arranged within said grip part of the handle.

5. The positional control apparatus of claim 4, wherein said condition confirmation means includes:

a grip confirmation switch which become in a conductive state by a gripping force generated by gripping said grip part;

two slip rings which respectively connected to the grip confirmation switch via two cables respectively;

two slip ring brushes to be contacted with said two slip rings; and a conduction sensor connected to said two slip ring brushes for detecting a conduction signal of said grip confirmation switch.

6. The positional control apparatus of claim 2, wherein said force detecting means detects the strength of the force applied by the operator to said handle, and includes a force sensor arranged between said grip pipe and said grip shaft, and a rotation angle sensor for detecting the rotation angle of said grip with respect to said movable part and being attached to said grip shaft.

7. The positional control apparatus of claim 2, wherein said direction detecting means detects the direction of the force applied by the operator to said handle, and includes a force sensor arranged between said grip pipe and said grip shaft, and a rotation angle sensor for detecting the rotation angle of said handle with respect to said movable part and being attached to said grip shaft.

8. The positional control apparatus of claim 2, wherein said axial moving amount calculation means is arranged within said arm part of the handle.

* * * * *